United States Patent [19]
Donig et al.

[11] Patent Number: 5,329,274
[45] Date of Patent: Jul. 12, 1994

[54] APPARATUS FOR CONTACTLESS DATA AND ENERGY TRANSMISSION AND METHOD FOR OPERATING SUCH AN APPARATUS

[75] Inventors: Günter Donig, Ottobrunn; Bruno Scheckel, Ebersberg; Karl-Reinhard Schön, Munich; Robert Reiner, Unterhaching, all of Fed. Rep. of Germany

[73] Assignee: Siemens Aktiengesellschaft, Munich, Fed. Rep. of Germany

[21] Appl. No.: 870,879

[22] Filed: Apr. 20, 1992

[30] Foreign Application Priority Data

Apr. 19, 1991 [DE] Fed. Rep. of Germany ..... 91106337

[51] Int. Cl.$^5$ .............................................. H04Q 1/00
[52] U.S. Cl. ..................... 340/825.340; 340/870.31; 340/653; 455/78; 324/110; 324/133; 365/101
[58] Field of Search ................ 340/825.72, 825.34, 340/825.31, 870.31, 635, 653; 455/41, 78; 324/110, 115, 133; 365/101

[56] References Cited

U.S. PATENT DOCUMENTS

| 4,434,400 | 2/1984 | Halder ................................. 324/110 |
| 4,697,183 | 9/1987 | Jenning et al. . | |
| 4,864,633 | 9/1989 | Chatelot ............................... 455/41 |
| 4,928,087 | 5/1990 | Kreft et al. . | |
| 5,070,500 | 12/1991 | Horinouchi ........................... 455/41 |

FOREIGN PATENT DOCUMENTS

| 0185610 | 6/1986 | European Pat. Off. . |
| 0309201 | 3/1989 | European Pat. Off. . |
| 0334804 | 9/1989 | European Pat. Off. . |
| 0466949 | 1/1992 | European Pat. Off. . |
| 62-297988 | 12/1987 | Japan . |

Primary Examiner—Donald J. Yusko
Assistant Examiner—Brian Zimmerman
Attorney, Agent, or Firm—Herbert L. Lerner; Laurence A. Greenberg

[57] ABSTRACT

An apparatus for contactless data and energy transmission and includes a stationary part having device for transmitting and receiving data and device for generating energy. A movable part has a plurality of rectifier devices each with at least one output and modulators each being connected downstream of a respective one of the rectifier devices. A first pair of coils is connected to the device for transmitting and receiving data and to the rectifier device for transmitting data from the stationary part to the movable part. A second pair of coils is connected to the device for generating energy and to the rectifier device for transmitting energy from the stationary part to the movable part. The coils in the stationary part are arbitrarily associated with the coils in the movable part, and data is transmitted from the movable part to the stationary part by a load variation at the coil of the movable part not being used for energy transmission. Controllable semiconductor elements each having a load path are connected between the at least one output of a respective one of the rectifier devices and a charge capacitor at which an unregulated operating voltage can be picked up, for delivering output signals of the rectifier device to the charge capacitor. A method for operating the apparatus includes ascertaining which coil is used for energy transmission during an initializing time within the movable part, and thereupon disconnecting the rectifier device and the modulator from the charge capacitor through the applicable controllable semiconductor element.

6 Claims, 2 Drawing Sheets

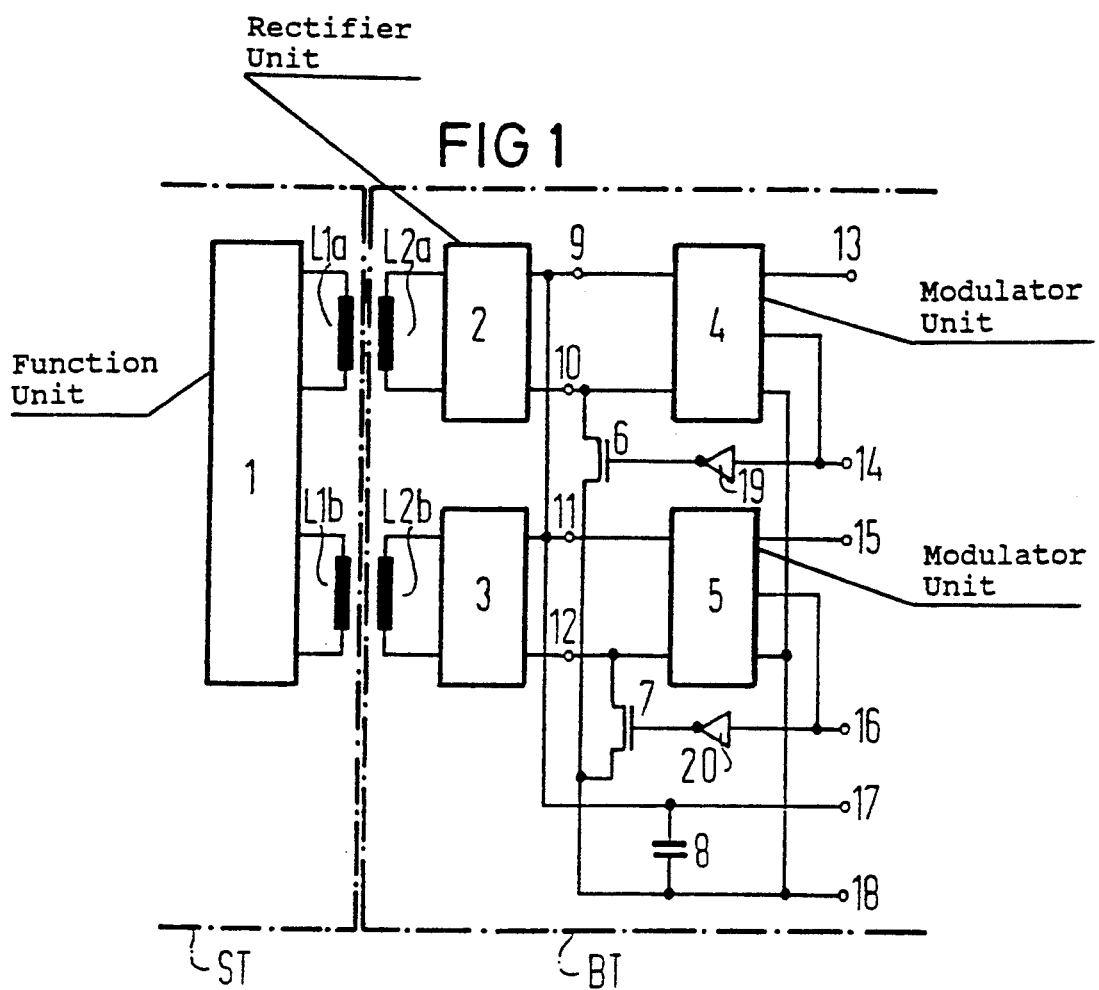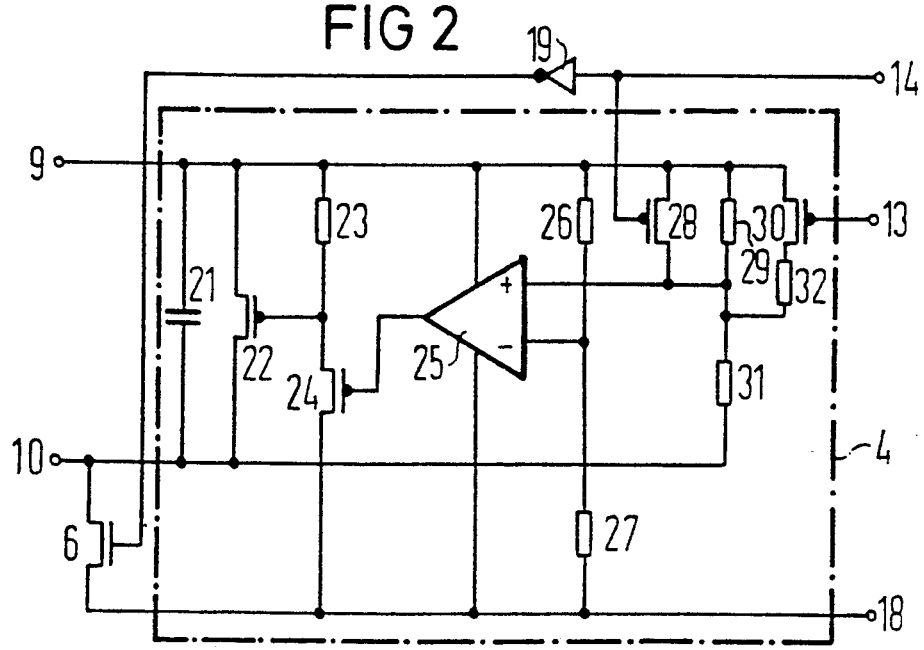

APPARATUS FOR CONTACTLESS DATA AND ENERGY TRANSMISSION AND METHOD FOR OPERATING SUCH AN APPARATUS

The invention relates to an apparatus for contactless data and energy transmission, including a stationary part having means for transmitting and receiving data, which are each respectively transmitted to a movable part with the aid of a first pair of coils and having means for generating energy, which is transmitted to the movable part through a respective second pair of coils, the coils of the stationary part are to be arbitrarily associated with the coils of the movable part, and the data transmission takes place from the movable part to the stationary part by means of a load variation at whichever coil of the movable part is not used for energy transmission, the coils of the movable part are each followed by rectifier means, and the rectifier means are each followed by a modulator. The invention also relates to a method for operating the apparatus.

Such an apparatus is described in Published European Application No. 0 466 949 A1, corresponding to U.S. Application Ser. No. 590,088, filed Sep. 28, 1990, now abandoned, and in particular in FIGS. 1 and 2 and the description thereof.

That apparatus for contactless data and energy transmission includes a stationary part (ST) having an oscillator (OSC) for contactless power transmission to a movable part (BT) with the aid of a pair of coils (L1A, L2A; L1B, L2B), wherein the oscillation of the oscillator (OSC) is split into a reference oscillation and an information oscillation, and a phase displacement with respect to the reference oscillation is forced upon the information oscillation as a function of the data (DT1) to be transmitted, the phase-displaced oscillation is delivered to the movable part (BT) through a first pair of coils (L1B, L2B and L1A, L2A, respectively) and the oscillation voltage is delivered to the movable part (BT) through a second pair of coils (L1A, L2A and L1B, L2B, respectively), wherein in the movable part (BT) the transmitted oscillations are delivered to a demodulator circuit (DEMOD), which recovers the data from the phase displacement, and a data transmission from the movable part (BT) to the stationary part (ST) takes place by means of load variation. The power transmission is accomplished with only the aid of a pair of coils, and the data transmission from the movable part to the stationary part is accomplished only by load variation at the coil of the movable part that is not used for power transmission.

In order to assure that the coils of the stationary part can be associated arbitrarily with coils of the movable part to form pairs of coils and thus to assure that energy or data can be transmitted through each of the two coils, even if not simultaneously, each of the two coils of the movable part is associated not only with a rectifier circuit but also at least with the final control element of a voltage regulator and moreover with at least one switch, which is capable of varying the load on the pair of coils associated with it as a function of its triggering and the resultant switch position. It is also possible for each of the coils to be associated with one voltage regulator and one variable load. In all such cases, it must be assured by means of a logical linkage that the amplitude modulator required for the data transmission from the movable part to the stationary part always varies the load of the pair of coils that has no part in the energy transmission, and has a voltage regulator or voltage regulator final control element that is consequently not active, or which does not have the voltage regulator connected to its output side.

If the coils of the movable part and the coils of the stationary part are intended to be arbitrarily couplable and therefore a demodulator circuit having a circuit unit for fixing the logic level of the signal is provided, then the circuit unit can also recognize, in the same way as it fixes the logic level, which of the coils of the movable part the reference oscillation is to be transmitted to and which of the coils of the movable part the information oscillation, which is variable in its phase relationship with the reference oscillation, is transmitted to. In such an apparatus for contactless data and energy transmission, as a function of a demodulator circuit signal containing the information, a logic linkage fixes which coil of the movable part is used for data transmission from the movable part to the stationary part and which coil is used for the energy transmission, which assures that the data transmission from the movable part to the stationary part is performed with the aid of the coil of the movable part that is not being used for energy transmission at that moment. In order to assure a continuous energy supply to the movable part, the coil transmitting the reference oscillation is followed by a voltage regulator, or activates a voltage regulator connected to the output side of the coil, and at the coil of the movable part that transmits the information oscillation, the data transmission from the movable part to the stationary part varies the load as a function of the data to be transmitted.

A disadvantage of the above-described configuration is that one respective load capacitor is needed for each coil and for each following rectifier, which requires a considerable amount of space upon integration. Another disadvantage is amplitude modulation feedback upon the supply branch resulting from whichever modulator is in operation at a given time.

It is accordingly an object of the invention to provide an apparatus for contactless data and energy transmission and a method for operating such an apparatus, which overcome the hereinafore-mentioned disadvantages of the heretofore-known methods and devices of this general type, which take the smallest possible amount of surface area for the charge capacitor in integration and which avoid the amplitude modulation feedback.

With the foregoing and other objects in view there is provided, in accordance with the invention, an apparatus for contactless data and energy transmission, comprising a stationary part having means for transmitting and receiving data and means for generating energy; a movable part having a plurality of rectifier means each with at least one output and modulators each being connected downstream of a respective one of the rectifier means; a first pair of coils connected to the means for transmitting and receiving data in the stationary part and to the rectifier means in the movable part for transmitting data from the stationary part to the movable part with the aid of the means for transmitting and receiving data; a second pair of coils connected to the means for generating energy in the stationary part and to the rectifier means in the movable part for transmitting energy from the stationary part to the movable part; the coils in the stationary part being arbitrarily associated with the coils in the movable part, and data being transmitted from the movable part to the stationary part by a load variation at which ever coil of the movable part not being used for energy transmission; a charge capacitor, and controllable semiconductor elements each having a load path connected between the at least one output of a respective one of the rectifier means and the charge capacitor at which an unregulated operating voltage can be picked up, for delivering output signals of the rectifier means to the charge capacitor.

In accordance with another feature of the invention, the at least one output of each of the rectifier means is in the form of first and second outputs; and each of the modulators includes a first transistor having a control terminal and having a load path through which the first and second outputs of one of the rectifier means are connected to one another; a second transistor having a control input and a load path, a resistor connected to the load path of the second transistor in a series circuit connected between operating voltage terminals, the series circuit having a node point connected to the control terminal of the first transistor; an operational amplifier having an output connected to the control input of the second transistor, a negative input receiving a reference voltage, and a positive input, a third transistor having a control input and having a load path connected between the positive input of the operational amplifier and the first output of the one rectifier means, a fourth transistor having a load path and a control input, a second resistor connected to the load path of the fourth transistor in a series circuit between the positive input of the operational amplifier and the first output of the one rectifier means; third and fourth resistors being connected in a series circuit between the two inputs having a node point connected to the positive input of the operational amplifier; a first control input connected to the control terminal of the fourth transistor for receiving a data signal; and a second control input connected to the control input of the third transistor for receiving a signal for disconnecting the modulator and the rectifier from the charge capacitor.

In accordance with a further feature of the invention, there is provided a capacitor connected between the two outputs of the one rectifier means.

In accordance with an added feature of the invention, there is provided a controllable current source connected between the operating voltage terminals; and a current mirror having an input side serially connected to the controllable current source and an output side connected between the control input of the first transistor and the second output of the one rectifier.

In accordance with an additional feature of the invention, the apparatus for contactless data and energy transmission is part of a check-cashing card or chip key.

With the objects of the invention in view, there is also provided a method for operating an apparatus for contactless data and energy transmission, which comprises ascertaining which coil is used for energy transmission during an initializing time within the movable part, and thereupon disconnecting the rectifier means and the modulator from the charge capacitor through the applicable controllable semiconductor element.

One advantage of the invention is that in terms of circuitry expense and complication, relatively modest means are provided, which make it possible for whichever modulation bridge is in operation at a given time to be disconnected from the supply branch.

Other features which are considered as characteristic for the invention are set forth in the appended claims.

Although the invention is illustrated and described herein as embodied in an apparatus for contactless data and energy transmission and a method for operating such an apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary block and schematic circuit diagram of a basic configuration of an apparatus for contactless data and energy transmission according to the invention;

FIG. 2 is a schematic circuit diagram of a modulator circuit of FIG. 1, according to the invention.

Figure 3:
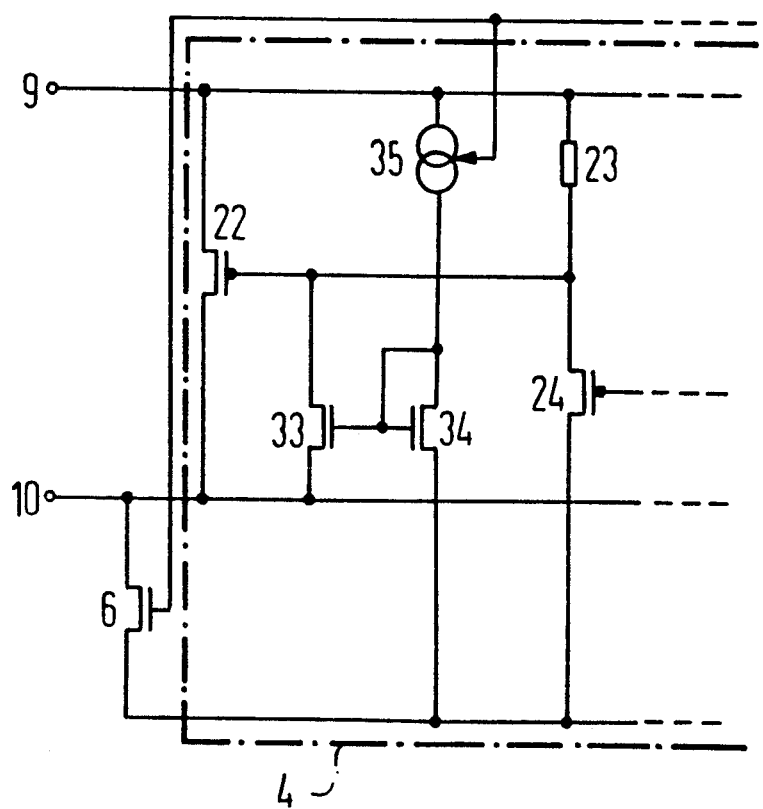
FIG. 3 is a fragmentary schematic circuit diagram of an expansion of the modulator circuit shown in FIG. 2.

Referring now to the figures of the drawing in detail and first, particularly, to FIG. 1 thereof, there are seen details of a stationary part ST, which has first and second transmission coils L1a, L1b and one function unit 1. The function unit 1 includes all of the essential devices for transmitting energy and for transmitting and receiving data. A movable part BT which is also shown in fragmentary form, has first and second coils L2a, L2b. Therefore, the coils L1a, L2a may be considered a first pair of coils and the coils L1b, L2b may be considered a second pair of coils. Of course, the coils L1b, L2b may be the first pair and the coils L1a, L2a may be the second pair. The first coil L2a is connected to a first rectifier unit 2. The rectifier unit 2 has first and second outputs 9, 10, which in turn are connected to a modulator unit 4. The modulator unit 4 has control inputs 13 and 14. The second coil L2b is also connected to a second rectifier unit 3, which in turn has first and second outputs 11, 12 that are in turn connected to a second modulator unit 5. The second modulator unit 5 again has two control inputs 15 and 16. The first outputs 9, 11 of the two rectifier units 2, 3 are connected to each other and they lead to a first terminal 17. Each of the second outputs 10, 12 of the two rectifier units 2, 3 is connected through the load path of a respective first and second switch transistor 6, 7 to a second terminal 18. A charge capacitor 8 is connected between the terminals 17 and 18. An unregulated operating voltage can then be picked up at the terminals 17 and 18. The reference potential that is present at the terminal 18 is also connected to the two modulator units 4, 5. The control inputs 14, 16, which may be referred to as first and second control terminals, are each connected through a respective inverter 19, 20 to the control input of one of the two switch transistors 6, 7.

As can be seen in FIG. 1, both rectifier/modulator branches 2, 4 and 3, 5 of the associated coils L2a, L2b are constructed completely identically. When the system is turned on, logical "0" signals are always present at the control inputs 14 and 16, so that both bridges are wired as supply bridges, since the respective transistors are each turned on and thus load the capacitor 8 with the energy transmitted through one of the two coils L2a, L2b. After the initializing time has elapsed, or during that time, a following unit which is not illustrated in FIG. 1 recognizes which coil L2a or L2b is being used for data transmission and disconnects it from the supply voltage through the corresponding control signal that it delivers to the control inputs 14, 16.

For example, it may be assumed that the coils L1b and L2b are used for energy transmission and the coils L1a and L2a are used for data transmission. The non-illustrated unit recognizes this within the initializing time and applies a logical "1" signal to the control terminal 14 and a logical "0" signal to the control terminal 16. As a result, the transistor 6 is blocked and thus the modulator unit 4 and the rectifier unit 2 are decoupled from the charge capacitor 8. If a data signal is then present at the terminal 13 of the modulator, it can be transmitted to the stationary part without affecting the operating voltage of the movable part, which can be picked up at the terminals 17, 18.

The modulator unit 4 that is required for the transmission is shown in further detail in FIG. 2. A capacitor 21 as well as the load path of a third transistor 22 are connected between the terminals 9 and 10. A series circuit of a first resistor 23 and the load path of a fourth transistor 24 are located between the output 9 and the terminal 18 carrying the reference potential. A node point of the series circuit is connected to the control input of the third transistor 22. The control input of the fourth transistor 24 is also connected to the output of an operational amplifier 25 which has operating voltage terminals that are connected both to the output 9 and to the reference potential terminal 18. A further series circuit including second and third resistors 29, 31 is connected between the outputs 9 and 10. A middle pickup of the series circuit is connected to the positive or non-inverting input of the operational amplifier 25. The load path of a further or fifth transistor 28 is connected parallel to the second resistor 29. A series circuit of the load path of a sixth transistor 30 and a fourth resistor 32 is also connected parallel to the second resistor 29. The control input of the fifth transistor 28 is connected to the control input or terminal 14, and the control input of the sixth transistor 30 is connected to the control input or terminal 13. Located between the output or terminal 9 and the reference potential terminal 18 is a series circuit including fifth and sixth resistors 26, 27. A node point between these resistors is connected to the negative or inverting input of the operational amplifier 25. In addition, the first transistor 6 and the inverter 19 of FIG. 1 are also shown in FIG. 2.

If a logical "1" signal is present at the input or terminal 13, then the potential at the output or terminal 10 is limited to the potential defined by the voltage dividers 26, 27 and 29, 31, because the sixth transistor 30 is blocked. This potential, or voltage, between the terminals 9, 10 represents the digital value "1". If a logical "0" signal is present at the control terminal 13, then the fourth resistor 32 connected parallel to the voltage divider 29, 31 ensures that a potential which defines the digital value "0" is established at the terminal 10. The load modulation, which is detected in the primary side in the stationary part, is achieved through the potential difference at the output or terminal 10 for the various digital states. The block capacitor 21 serves to smooth the pulsating direct voltage at the outputs or terminals 9, 10 of the turned-off bridge sufficiently, so that the parasitic substrate transistor of the first transistor 6 is not driven. When considering the modulator 4 alone, the transistors 22, 24, 28, 30 may be considered the first through fourth transistors, and the resistors 23, 32, 29 and 31 may be considered the first through fourth resistors.

Another embodiment of a modulator circuit is shown in FIG. 3. FIG. 3 shows only the region of the circuit configuration that has been expanded as compared with FIG. 2. Once again, the first transistor 6 is shown outside the modulator circuit 4. Inside the modulator circuit 4, the third transistor 22, the first resistor 23 and the fourth transistor 24 of FIG. 2 are shown. A new feature which is provided in FIG. 3 is a current mirror that includes a controllable current source 35 and seventh and eighth transistors 33, 34. The controllable current source 35 is connected between the output or terminal 9 and the reference potential terminal 18. The load path of the eighth transistor 34 is connected in series with the controllable current source 35. The load path of the seventh transistor 33 is connected between the control input of the third transistor 22 and the output or terminal 10. The control inputs of the seventh and eighth transistors 33, 34 are connected both to one another and to a node point of the series circuit including the controllable current source 35 and the load path of the eighth transistor 34. The other components correspond to those shown in FIG. 2. Only the capacitor 21 can advantageously be omitted in this case.

The current mirror circuit 33, 34, 35 represents a so-called clamping circuit, which prevents the potential at the terminal 10 from dropping below a predetermined reference when the rectifier unit or bridge 2 is turned off by the reference potential. The capacitor 21 can be dispensed with because of this circuit. When the bridge is turned off through the signal present at the terminal 14, the current source 35 is activated, which turns on the third transistor 22 through the step-up caused by the transistors 33, 34 whenever the potential at the output or terminal 10 drops below the predetermined reference. Since switching is performed at the control input of the already existing third transistor 22, the required chip area is much smaller as compared with that for a required block capacitor 21.

In the case of the modulator 5 of FIG. 1, the same embodiments apply as for the modulator 4. For the sake of simplicity, only the modulator 4 has been described in detail.

In this context, apparatuses for contactless data and energy transmission are systems in which a data carrier is connected to both the stationary part ST and the movable part BT of the apparatus for contactless data and energy transmission, and a data processing unit is connected to at least the stationary part ST.

The movable part BT may be constructed in the form of a key. In access systems, the stationary part ST is then constructed in the form of a lock. In data exchange systems, the stationary part ST is constructed in the form of a read/write unit, which may possibly be coupled to a data processing unit.

If the key is to be used purely as a data carrier, then the stationary part ST is, for instance, a read/write unit that is used only for data exchange. For instance, in the automotive field, the key would store individualized motor vehicle data in memory.

The movable part BT of a configuration for contactless data and energy transmission according to the invention may also be constructed in the form of a chip card or "smart card". In that case, the stationary part ST is part of a reading unit or of a read/write unit.

We claim:

1. An apparatus for contactless data and energy transmission, comprising:

a stationary part having means for transmitting and receiving data and means for generating energy;

a movable part having first and second rectifier means each with a first and a second output and first and second modulators each being connected downstream of a respective one of said first and second rectifier means;

a first coil connected to said means for transmitting and receiving data in said stationary part;

a second coil connected to said means for generating energy in said stationary part;

third and fourth coils each being connected to a respective one of said first and second rectifier means in said movable part;

said first and second coils in said stationary part being arbitrarily associated with said third and fourth coils in said movable part so as to form a pair of coils for energy transmission from said stationary part to said movable part and a pair of coils for data transmission between said movable part and said stationary part, data being transmitted from said movable part to said stationary part by a load variation at one of said third and fourth coils of said movable part not being used for energy transmission;

controllable semiconductor elements each having a load path;

a charge capacitor having first and second terminals at which an unregulated operating voltage can be picked up; said first terminal of said capacitor being connected with each of said first output terminals of said first and second rectifier means and said second terminal of said capacitor being connected with each of said second output terminals of said first and second rectifier means via said load path of said controllable semiconductor elements.

2. The apparatus for contactless data and energy transmission according to claim 1, wherein each of said modulators includes:

a first transistor having a control terminal and having a load path through which the first and second outputs of one of said rectifier means are connected to one another;

a second transistor having a control input and a load path, a resistor connected to the load path of said second transistor in a series circuit connected between said first output terminal of a respective one of said first and second rectifier means and said second terminal of said charge capacitor, said series circuit having a node point connected to the control terminal of said first transistor;

an operational amplifier having an output connected to the control input of said second transistor, a negative input receiving a reference voltage, and a positive input, a third transistor having a control input and having a load path connected between the positive input of said operational amplifier and the first output of said one rectifier means, a fourth transistor having a load path and a control input, a second resistor connected to the load path of said fourth transistor in a series circuit between the positive input of said operational amplifier and the first output of said one rectifier means;

third and fourth resistors being connected in a series circuit between the tow inputs having a node point connected to the positive input of said operational amplifier;

a first control input connected to the control terminal of said fourth transistor for receiving a data signal; and a second control input connected to the control input of said third transistor for receiving a signal for disconnecting said modulator and said rectifier from said charge capacitor.

3. The apparatus for contactless data and energy transmission according to claim 2, including a capacitor connected between said first and second outputs of each of said first and second rectifier means.

4. The apparatus for contactless data and energy transmission according to claim 2, including
a controllable current source connected between said first output terminal of a respective one of said first and second rectifier means and said second terminal of said charge capacitor; and
a current mirror having an input side serially connected to said controllable current source and an output side connected between the control input of said first transistor and the second output of said one rectifier.

5. A check-cashing card or chip key, comprising an apparatus for contactless data and energy transmission, including:

a stationary part having means for transmitting and receiving data and means for generating energy;

a movable part having first and second rectifier means each with a first and a second output and first and second modulators each being connected downstream of a respective one of said first and second rectifier means;

a first coil connected to said means for transmitting and receiving data in said stationary part;

a second coil connected to said means for generating energy in said stationary part; third and fourth coils each being connected to a respective one of said first and second rectifier means in said movable part;

said first and second coils in said stationary part being arbitrarily associated with said third and fourth coils in said movable part so as to form a pair of coils for energy transmission from said stationary part to said movable part and a pair of coils for data transmission between said movable part and said stationary part, data being transmitted from said movable part to said stationary part by a load variation at one of said third and fourth coils of said movable part not being used for energy transmission;

controllable semiconductor elements each having a load path;

a charge capacitor having first and second terminals at which an unregulated operating voltage can be picked up; said first terminal of said capacitor being connected with each of said first output terminals of said first and second rectifier means and said second terminal of said capacitor being connected with each of said second output terminals of said first and second rectifier means via said load path of said controllable semiconductor elements.

6. In an apparatus for contactless data and energy transmission including:

a stationary part having means for transmitting and receiving data and means for generating energy;

a movable part having first and second rectifier means each with a first and a second output and first and second modulators each being connected downstream of a respective one of the first and second rectifier means;

a first coil connected to the means for transmitting and receiving data in the stationary part;

a second coil connected to the means for generating energy in the stationary part;

third and fourth coils each being connected to a respective one of the first and second rectifier means in the movable part;

the first and second coils in the stationary part being arbitrarily associated with the first and second coils in the movable part so as to form a pair of coils for energy transmission from the stationary part to the movable part and a pair of coils for data transmission between the movable part and the stationary part, data being transmitted from the movable part to the stationary part by a load variation at that coil of the first and second coils of the movable part not being used for energy transmission;

controllable semiconductor elements each having a load path;

a charge capacitor having first and second terminals at which an unregulated operating voltage can be picked up; one of the first and second terminals of the capacitor being connected with each of the first output terminals of the first and second rectifier means and the other of the first and second terminals of the capacitor being connected with each of the second output terminals of the first and second rectifier means via the load path of the controllable semiconductor elements;

a method for operating the apparatus for contactless data and energy transmission, which comprises:

ascertaining which coil is used for energy transmission during an initializing time within the movable part, and thereupon disconnecting the rectifier means and the modulator from the charge capacitor through the applicable controllable semiconductor element.

* * * * *